Dec. 27, 1960 M. C. ABBOTT ET AL 2,966,671

DATA TRANSFORMATION SYSTEMS

Filed Aug. 5, 1957 2 Sheets-Sheet 1

INVENTORS
M. C. ABBOTT
B. D. MERRILL

BY Jean C. Chognard

ATTORNEY

INVENTORS
M. C. ABBOTT
B. D. MERRILL
BY Jean C. Chapman
ATTORNEY

United States Patent Office 2,966,671
Patented Dec. 27, 1960

2,966,671

DATA TRANSFORMATION SYSTEMS

Matthew C. Abbott, Wakefield, and Bushnell D. Merrill, Boston, Mass., assignors to Electronics Corporation of America, Cambridge, Mass., a corporation of Massachusetts Filed Aug. 5, 1957, Ser. No. 676,307

2 Claims. (Cl. 340—347)

This invention relates to improvements in data transformation systems, and more particularly to analogue to digital converters.

In the operation of digital computing equipment input information must be supplied to the computer in digital form. The required information however is often available in terms of a continuous variable, such as the position of a shaft on which a directional antenna is located, for specific example. Before this analogue information can be used it must be translated into digital form.

One known method of translating from analogue to digital information uses a transparent code wheel which is rotatably coupled to the source of analogue information. Separate rings on the wheel represent the digits of a desired code, and each of these rings is composed of opaque and transparent portions corresponding to the desired digital representation. Photoelectric reading heads for the digit rings change their output indications depending on the transparency or opaqueness of the adjacent portions of the digit rings, and thus give a digital representation of the angular position of the code wheel. These output indications are, for instance, in the form of a positive-going pulse when the adjacent portion of the digit ring is transparent, and in the absence of any pulse when the adjacent portion of the digit ring is opaque. The occurrence of a positive-going noise pulse, when there should be no pulse, may lead to an error in the output indication.

It is the principal object of this invention to decrease the possibility of errors due to noise pulses in an analogue to digital converter.

It is another object of this invention to provide a code wheel for analogue to digital converters which is capable of yielding output signals which are substantially error-free.

In accordance with the illustrated embodiment of this invention, there is provided a code wheel in which each channel comprises two complementary rings, so that output indications are either in the form of a positive-going pulse or a negative-going pulse.

Other and incidental objects of the present invention will be understood by those skilled in the art from a reading of the following specification and an inspection of the accompanying drawing in which.

Figure 1:
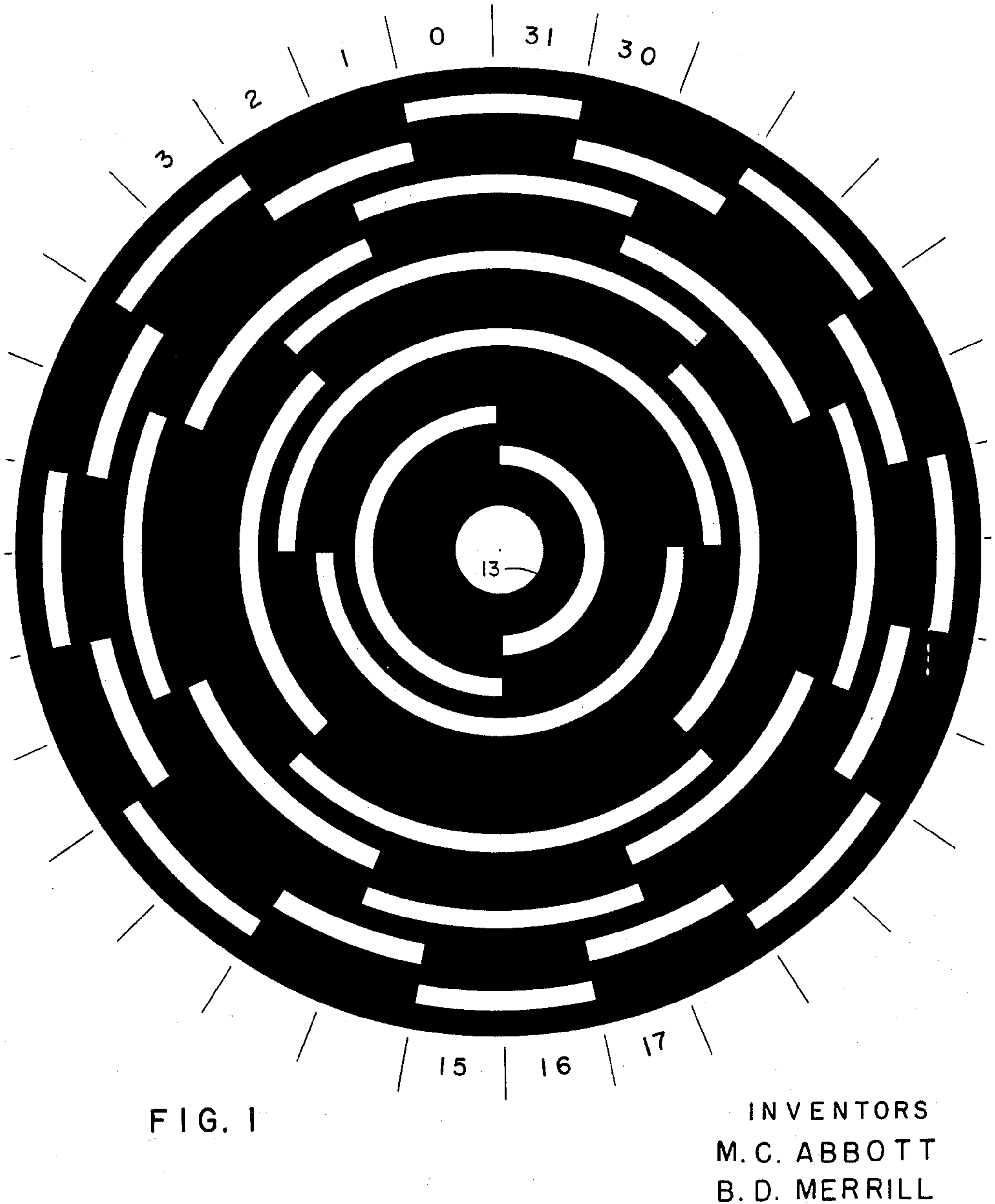
Figure 1 illustrates a code wheel in accordance with this invention.

Referring now to Figure 1 there is shown a code wheel 13 employed for cyclic binary coding. The coding or commutating elements of the wheel 13 comprise five channels, each channel being made of a double ring of commutating elements. Each channel comprises one ring which is arranged in accordance with the cyclic binary code, and another ring the commutating elements of which are complementary to those of the first-mentioned ring. In other words, if a commutating element of the first ring in a given sector is transparent, the commutating element of the other ring of the pair, in the same sector, is opaque and vice versa.

Figure 2:
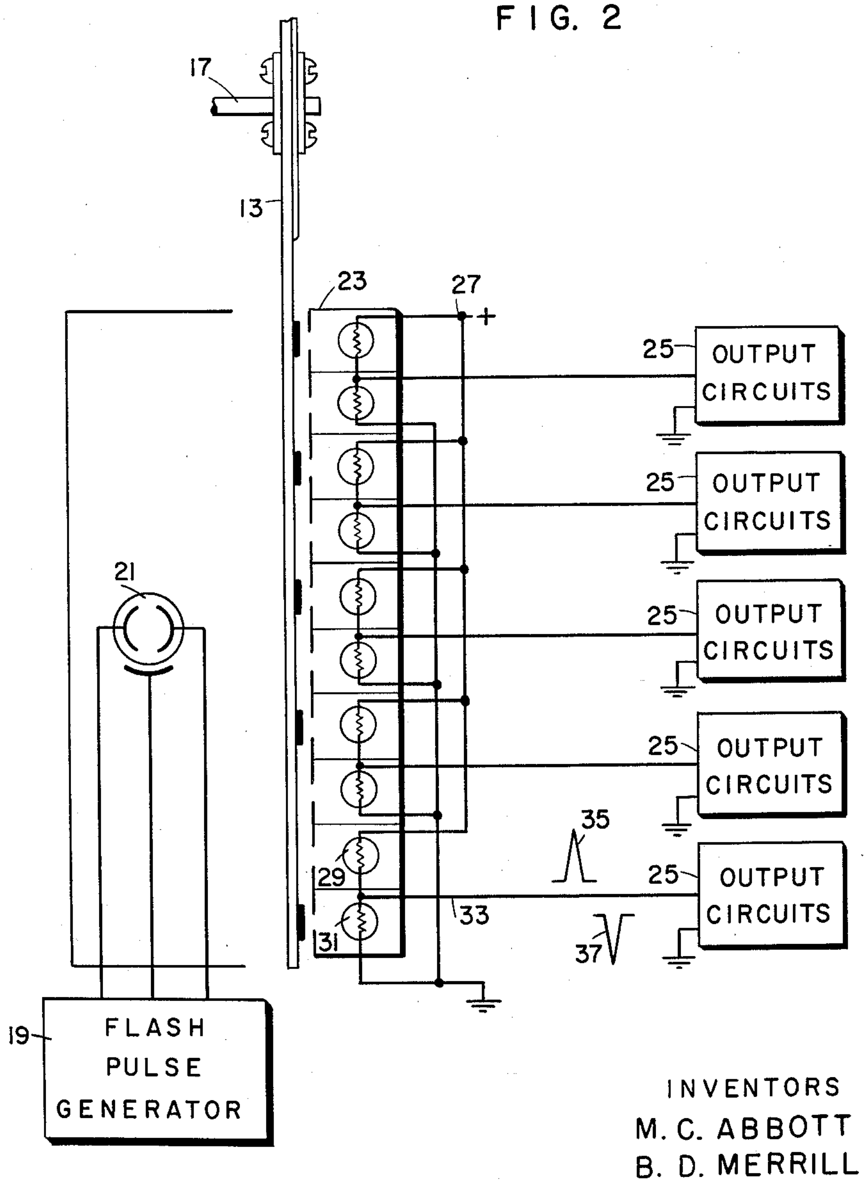
Figure 2 illustrates, by means of a block and circuit diagram, an analogue to digital converter in accordance with this invention.

The advantages of this arrangement can best be understood by referring to Figure 2. The code wheel 13 rotates about a shaft 17. A flash pulse generator 19, actuating the flash lamp 21, provides means operating at a chosen sampling rate for coupling the reading head 23 and the commutating elements within a narrow indexing width. The photoelectric cells in the reading head 23 are preferably photoconductive cells and with the associated output circuits 25 comprise means responsive to the coupling for generating and registering simultaneously and in five parallel channels the digit signals of a five-digit binary number which represents the instantaneous relative position of the code wheel 13 and the reading head 23. The photoelectric cells in the reading head 23 are grouped in pairs, each pair comprising two cells connected in series between a source of positive potential 27 and ground. For instance, looking at the channel closest to the rim of the wheel 13, we have two photoelectric cells 29 and 31 connected in series, with a center tap 33 leading to the output circuit 25. The two cells 29 and 31 are positioned so as to read the code inscribed upon the channel on the code wheel 13, which channel comprises two complementary rings. When the flash lamp 21 is pulsed to take a reading, one of the two cells 29 and 31 will have light impinging thereon and the other will be in the dark. Let us take as a reference potential the potential at center tap 33 with respect to ground when the flash lamp is dark. We shall have at tap 33, when the flash lamp 21 is pulsed, a positive-going pulse 35 when photocell 29 sees light and photocell 31 is dark, and a negative-going pulse 37 when the photocell 31 sees light and the photocell 29 is dark.

It is easier to distinguish between pulses 35 and 37 than it is between a pulse and no pulse. Further, since the noise pulses due to external sources, which are present on both rings of a pair within a given sector are very nearly similar, they are bucked one against the other and very nearly cancel each other out in the output signal. The signal-to-noise ratio in the output signal is thus greatly improved, and the analogue to digital converter described is less subject to errors due to noise than those not embodying the features of the invention.

The word "transparent" as used in this specification and in the claims is used in its broad sense and means "capable of transmitting light or radiation." The word "opaque" means "capable of blocking light or radiation."

We claim:

1. In an analogue to digital converter, a code wheel having a binary code thereon comprising a plurality of channels, each channel comprising a first ring having opaque and transparent commutating elements arranged in sectors in accordance with a binary code, and a second ring having transparent commutating elements when the commutating elements of the first ring in the same sector are opaque, and opaque commutating elements when the commutating elements of the first ring in the same sector are transparent, photoelectric means to derive a first electrical signal from said first ring when said channel is in a position indicative of one digit of said binary code, photoelectric means to derive from said second ring a second electrical signal having a polarity opposite to that of said first signal when said channel is in a position indicative of the other digit of said binary code, an output circuit, and means to apply said first and second signals to said output circuit.

2. In an analogue to digital converter, a code wheel having a binary code thereon comprising a plurality of concentric channels, each channel comprising a first ring having opaque and transparent commutating elements arranged in sectors in accordance with a binary code, and a second ring having transparent commutating elements when the commutating elements of the first ring in the same sector are opaque, and opaque commutating elements when the commutating elements of the first ring in the same sector are transparent, photoelectric means to derive a first electrical signal from said first ring when said channel is in a position indicative of one digit of said binary code, photoelectric means to derive a second electrical signal from said second ring when said channel is in a position indicative of the other digit of said binary code, an output circuit, and means to apply said first and second signals in polarity opposition to said output circuit.

References Cited in the file of this patent

UNITED STATES PATENTS

| | | |
|---|---|---|
| 2,685,054 | Brenner et al. | July 27, 1954 |
| 2,685,082 | Beman et al. | July 27, 1954 |
| 2,764,344 | Wescott | Sept. 25, 1956 |